Aug. 3, 1926.
E. C. LOETSCHER
1,594,889
METHOD OF MAKING VENEERED WOOD PRODUCTS
Filed Oct. 31, 1925
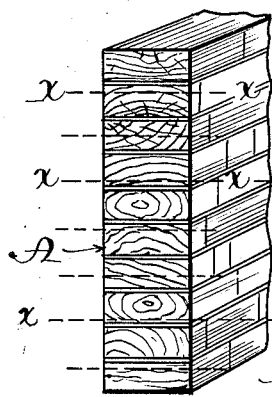
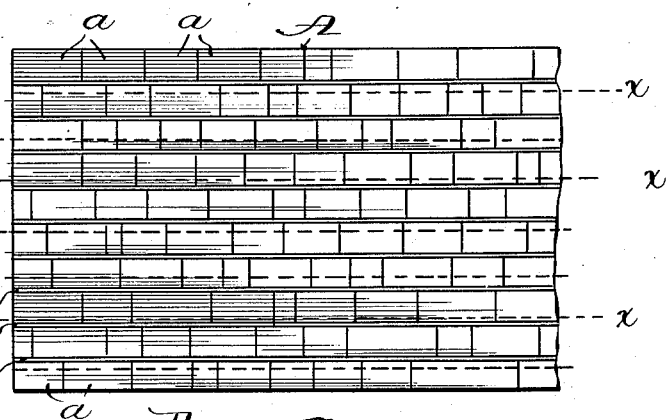
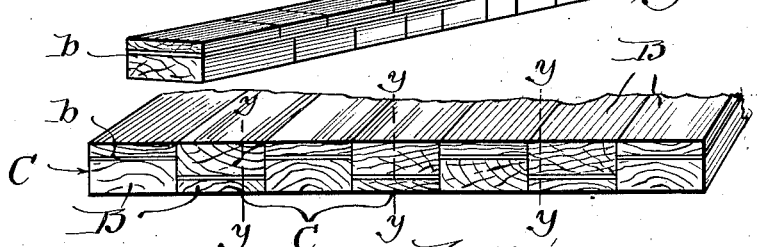
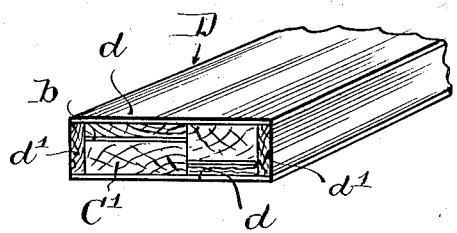
Inventor,
Emil C. Loetscher.

Patented Aug. 3, 1926.

1,594,889

UNITED STATES PATENT OFFICE.

EMIL C. LOETSCHER, OF DUBUQUE, IOWA.

METHOD OF MAKING VENEERED WOOD PRODUCTS.

Application filed October 31, 1925. Serial No. 66,047.

This invention relates to methods of making veneered wood products, and more particularly to methods of making what is known as core lumber or material to be used for the core or body of veneered lumber, in the manufacture of doors, sash and like mill work, the material of the core being usually pine and the veneering, oak, mahogany or other hard wood, although it is conceivable that metal or some wood substitute may also be used as the finishing or veneering surface.

The object of the invention is to afford a method having as its primary object, the production of a stronger and more substantial material for the making of veneered products, and similarly, to afford a method of construction which will eliminate warping, swelling or other deformity in the finished product.

A further object of the invention is to provide a method of manufacture which will permit the use of waste lumber by making it possible to employ the shortest pieces and scraps of lumber, which heretofore have been entirely useless except for kindling, or fuel.

The object sought to be accomplished by the method of manufacture hereinafter to be described in detail, will be better appreciated after a brief description of the methods now commonly in use. As above suggested, and as well known in the art, veneering as applied to the wood-working art is a process of applying thin slabs or strips of a more expensive grade of lumber, such as oak, mahogany, walnut or the like, to a core of less expensive material such as pine. To further reduce the cost of manufacture, the core material is manufactured from short lengths of lumber which otherwise are too short for use. Large quantities of the material accumulate in the manufacture of doors, sash, and similar forms of mill work, and hence it is a matter of considerable saving to be able to make use of this material.

The common method of manufacturing core material for veneered products, is to assemble the short lengths of lumber of uniform width and thickness, into the form of planks by gluing the pieces together face to face and end to end, the pieces being arranged so that their joints do not coincide somewhat after the same manner as layers of brick are superimposed upon each other in the building of a wall. After the planks have been made, they are sawed lengthwise into a number of narrow pieces, thus giving the width of core material required. Owing to the fact that a break joint construction is employed in order that the planks will not be weakened, the material used in making the planks is limited to lengths not less than six inches. In other words, pieces shorter than six inches cannot be used on account of the extreme shortness and the large number of joints which have to be offset to afford the break joint construction before mentioned. For this reason, there still remains a considerable amount of waste in the form of pieces or blocks of less than six inches in length which are ordinarily not usable.

The present method of construction departs from the ordinary methods in that it permits the use of pieces or blocks of practically any length, even as short as two inches, thus effectuating an almost complete elimination of waste, aside from introducing a feature which affords the same, if not a greater degree of strength in that a break joint is provided for without regard to the location of the joints between the blocks.

A clearer understanding of the novel method of manufacture will be understood from the following description, taken in conjunction with the accompanying drawings, in which—

Figure 1 is a view in side elevation of a plank made up of a multitude of small blocks.

Figure 2 is a perspective view of the plank showing the end section.

Figure 3 is a perspective view of a single length of material after the plank has been sawed along parallel lines.

Figure 4 is a perspective view of a plank made up of a plurality of members, such as shown in Figure 3, joined edge to edge; and Figure 5 is a perspective view of a length of veneered lumber having as its core a length of material cut from the plank shown in Figure 4 and covered with the usual veneering material.

Assuming that a mill has on hand a large quantity of short ends of lumber, such as would accumulate in the course of manufacture, this material would be first assembled, and by the use of suitable planing and sawing machines, the short pieces or blocks are reduced to a uniform thickness of say two inches, with planed surfaces on both sides. Moreover, it may be assumed that these short pieces and blocks are of a uniform width of say, three and one-half or three and three-fourths inches. As clearly shown in Figure 1, these blocks $a$ whose lengthwise dimensions are determined by the direction of the grain, are assembled end to end in a row to form what may be considered the lower ply of the plank A to be built up. It will be observed that these short pieces or blocks $a$ are of different lengths, the shortest being say two inches, and the longest not over six inches, although it will be understood that lengths up to twelve, fourteen or eighteen inches may be used. For illustration, however, the shorter lengths have been used in order to bring out more clearly the novel features of the method.

Having assembled the first row of blocks $a$ and to any length determined upon to be that of the plank, a thin strip of wood $b$ of say one-eighth inch in thickness is laid along one face of the blocks, whereupon the second row of blocks is assembled, and this process being continued, building up row after row with the thin strips $b$ between each row. It will be understood that the plank is assembled on the horizontal rather than vertically, and that glue is applied between the contacting surfaces of the rows of blocks and the intermediate strips $b$. When a plank has been assembled, clamps are applied so as to press the blocks firmly together, and allowed to dry in this condition thus forming the solid plank A of composite construction.

After the plank has been thoroughly dried and ready for further use, it is then passed through a planing machine so that both faces are perfectly smooth and regular. This having been done, the plank is then sawed or ripped into a plurality of pieces having a thickness of say one and seven-eighths inches or any other thickness, depending on the dimensions of the veneered lumber in which it is to be used. Thus, as clearly shown in Figures 1 and 2, the several dotted lines $x$—$x$ indicate the lines of cutting or ripsawing whereby the plank is reduced to a plurality of composite timbers B of say three and three-fourths inches in width and one and seven-eighths inches in thickness, and of the same length as the plank from which they were cut. Moreover, in the cutting or ripping of the plank, the lines $x$—$x$ so divide the same transversely as to include in each timber B one of the intermediate strips $b$ with the block material on either side. Moreover, it is preferred that the thickness of the block material be greater on one side of the strip than on the other, as clearly shown in Figure 3, and for the reason presently to be pointed out.

Having thus reduced the plank A shown in Figures 1 and 2 into a number of composite timbers B, as shown in Figure 3, these same timbers are again assembled into plank form, as shown in Figure 4, by laying said timbers side by side with their side edges or faces in abutting contact so that the thickness of the plank to be thus made is equal to the distance between the cuts in the process of ripsawing the original plank A. As before, these timbers B are glued and clamped together, and when dried a plank C somewhat wider and thinner than the initial plank is formed. It may be mentioned at this point, that any of the material remaining after the ripping of the original plank is not utilized in making up the second plank, but is nevertheless retained for further use in the making of another plank A, so that there is no waste.

Having thus assembled the composite pieces B into the form of the plank C, the same is then sawed into several pieces by ripping the plank along the lines $y$—$y$ as shown in Figure 4, wherein the lines of sawing divide the plank into four lengths of material C′. These lines of cutting in each instance include one complete composite piece B together with a portion or section of another. In other words, the width of one of the pieces C′ is greater than the width of a single composite piece B but less than that of two of them edge to edge, although as clearly shown in Figure 4, the cross-sectional make up of the pieces thus sawed or ripped from the plank C do not present the same sectional contour.

In Figure 5, is disclosed a single piece C′ cut from the plank C to form a piece of veneered lumber, such as might be used as the stile member of a door. In this particular disclosure, the core member C′ may be either one of the outermost pieces cut from the plank C.

In making the piece of veneered material D shown in Figure 5, the standard method of veneering is followed, namely, by applying thin slabs $d$ of oak or other material to the opposite faces of the core C′ and applying somewhat thicker strips $d'$ along the edges of the core. For example, the thickness of the slabs $d$ may be one-eighth inch, while the strips $d'$ are three-fourth inch in thickness. Moreover, it will be noted that the edges of the slabs $d$ overlap the edges of the strips so that the joints appear along the edges rather than on the faces of the veneered piece.

Manifestly, the size of the core C′ depends upon the outside dimensions of the veneered lumber to be made, the thickness of the veneering material being taken into consideration in arriving at the proper dimensions. For this reason, it is unnecessary to mention the exact dimensions of the cores. It is to be noted particularly that in making the plank C, the composite pieces B are so arranged that the strips b are arranged in staggered relation transversely of the plank as they appear in end section. The reason for this is that it not only affords a break joint construction but places the elements of the core under opposing forces which prevents warping, this because the strips b are normally under tension while the composite blocks are under compression. Thus by making the core members in the manner herein described, it is possible to provide a material almost as strong as a solid piece of lumber by reason of the trussing action of the intermediate strips 6, as well as their joint breaking function, and further, utilize in the process material which by any other method now in use would be wholly wasted.

Although I have set forth the preferred method, the same may be variously modified without departing from the spirit of the invention. For instance, under some circumstances, material in longer lengths than six inches may be available, in which case the thin strips may be omitted in the making of the first plank, since there is not the same necessity for the break joint feature. However, the same advantage obtains in the ripsawing of the initial plank, the formation of a second plank of the thickness of the material required, and again ripsawing it into lengths of the required width. For this reason, I do not wish to limit the invention to the specific method herein disclosed.

Having set forth the essential advantages of my novel method and the preferred manner of applying it, I claim the following to be my invention:

1. A method of making veneered products consisting of constructing a plank by gluing a multitude of blocks together in rows, ripsawing the plank into a plurality of pieces, forming another plank of said pieces by gluing the same together edge to edge, ripsawing said last mentioned plank into pieces of predetermined width and applying a veneering material to the surface of said pieces.

2. A method of making veneered products consisting of uniting a multitude of blocks of uniform width and thickness into a composite member, ripsawing said composite member into a plurality of pieces, forming another composite member by uniting said pieces edge to edge, ripsawing said second formed composite member into pieces of predetermined width and applying relatively thin layers of veneering material to the surfaces of said last mentioned pieces.

3. A method of making core material for veneered lumber, consisting of assembling a multitude of blocks of uniform width and thickness in rows, gluing the blocks in each row together end to end, placing thin strips between each row of blocks, drying said assembled blocks under pressure, ripsawing the resulting material into composite pieces and applying thin strips of wood to the surface of said composite pieces.

4. A method of making veneered products consisting of constructing a plank by gluing a multitude of blocks together in rows, with a thin strip of material between the rows, ripsawing the plank into a plurality of pieces, forming another plank of said pieces by gluing the same together edge to edge, ripsawing said last mentioned plank into pieces of predetermined width and including veneering strips to the faces of said last mentioned pieces.

5. A method of making core material for veneered lumber consisting of assembling a multitude of blocks of uniform width and thickness in rows, gluing the blocks in each row together end to end, with thin strips between each row of blocks, drying said assembled blocks under pressure, ripsawing the resulting pieces into composite pieces, gluing said pieces together edge to edge, and ripsawing the resulting material into relatively narrow pieces.

6. A method of making core material for veneered lumber consisting of assembling a multitude of blocks of uniform width and thickness in rows, gluing the blocks in each row together end to end, with thin strips between each row of blocks to form a plank, ripsawing the plank into composite pieces each including a strip, gluing said pieces together edge to edge with said strips, and ripsawing the resulting material into relatively narrow pieces.

7. A method of making core material for veneered lumber consisting of assembling a multitude of relatively short blocks of lumber by gluing them together in rows, with the blocks in each row arranged end to end, and thin strips interposed between each row, ripsawing the resulting material into pieces of a width greater than that of a single row of blocks, gluing said pieces together edge to edge, and ripsawing the resulting product into pieces of a width greater than a single piece thereof.

8. A method of making core material for veneered lumber consisting of assembling a multitude for relatively short blocks of lumber by gluing them together in rows, with the blocks in each row arranged end to end, and thin strips interposed between each row to form a plank, ripsawing said plank along parallel lines to reduce said plank to composite pieces each having at least one strip extending transversely thereof, gluing said composite pieces together into plank form with the strips of said pieces extending transversely thereof, and ripsawing said last mentioned plank into core pieces of a width to include portions of at least two of said pieces.

9. A method of making core material for veneered lumber consisting of assembling a multitude of relatively short blocks of lumber by gluing them together in the form of a composite plank with the blocks end to end, ripsawing the plank into pieces of a predetermined width, gluing said pieces together edge to edge to form a plank wider and thinner than said first mentioned plank, and ripsawing the last mentioned plank into pieces of a predetermined width.

10. A method of making core material for veneered lumber consisting of assembling a multitude of relatively short blocks of lumber by gluing them together in rows, with the blocks in each row arranged end to end, and thin strips interposed between each row to form a plank, ripsawing said plank along parallel lines to reduce said plank to composite pieces each having at least one strip extending transversely thereof, gluing said composite pieces together into plank form with the strips of said pieces extending transversely thereof and in alternately offset relation, and ripsawing said last mentioned plank into core pieces of a width to include portions of at least two of said pieces.

Signed at Dubuque, Iowa, this 28th day of October, 1925.

EMIL C. LOETSCHER.